US011368518B2

(12) United States Patent
Kreiner et al.

(10) Patent No.: US 11,368,518 B2
(45) Date of Patent: *Jun. 21, 2022

(54) FACILITATING MANAGEMENT OF COMMUNICATIONS SYSTEMS

(71) Applicant: AT&T Intellectual Property I, L.P., Atlanta, GA (US)

(72) Inventors: Barrett M. Kreiner, Woodstock, GA (US); Jonathan L. Reeves, Roswell, GA (US); Jana Gottlieb, Fenton, MO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/793,049

(22) Filed: Feb. 18, 2020

(65) Prior Publication Data

US 2020/0186595 A1     Jun. 11, 2020

Related U.S. Application Data

(63) Continuation of application No. 15/173,273, filed on Jun. 3, 2016, now Pat. No. 10,616,311.

(51) Int. Cl.
*H04L 67/10*     (2022.01)
*H04L 43/0876*     (2022.01)
(Continued)

(52) U.S. Cl.
CPC .......... *H04L 67/10* (2013.01); *H04L 41/0823* (2013.01); *H04L 41/5025* (2013.01); *H04L 43/0876* (2013.01)

(58) Field of Classification Search
CPC ................ H04L 67/10; H04L 41/0823; H04L 41/5025; H04L 43/0876
See application file for complete search history.

(56) References Cited

U.S. PATENT DOCUMENTS 6,314,398 B1    11/2001    Junqua et al.
8,196,210 B2    6/2012    Sterin
(Continued)

FOREIGN PATENT DOCUMENTS

EP          2216732 A1    8/2010
WO    2009099476 A1    8/2009

OTHER PUBLICATIONS

Brown et al., Audio Representation Of Graphs: A Quick Look, 2006, University of Manchester, pp. 84-85 (Year: 2006).*

(Continued)

*Primary Examiner* — Joseph L Greene
(74) *Attorney, Agent, or Firm* — Amin, Turocy & Watson, LLP

(57) ABSTRACT

Management of communication systems is facilitated. A method comprises: processing, by a device comprising a processor, first information representative of human-readable language and indicative of terms of agreements associated with respective software for a communication system, wherein the communication system is arranged according to a first configuration of virtual machines and server devices, and wherein the agreements comprise license agreements for the respective software; converting, by the device, the first information into machine-readable rules indicative of the terms of the agreements associated with the respective software for the communication system; and based on a result of comparing the machine-readable rules and first information indicative of the first configuration, determining, by the device, whether the first configuration of the communication system satisfies a defined criterion.

20 Claims, 13 Drawing Sheets

(51) Int. Cl.
*H04L 41/5025* (2022.01)
*H04L 41/0823* (2022.01)

(56) References Cited

U.S. PATENT DOCUMENTS

| | | | |
|---|---|---|---|
| 8,209,687 B2 | 6/2012 | Yuyitung et al. | |
| 8,341,732 B2 | 12/2012 | Croft et al. | |
| 8,429,630 B2 | 4/2013 | Nickolov et al. | |
| 8,433,801 B1 | 4/2013 | Yemini et al. | |
| 8,528,100 B2 | 9/2013 | Boudreau et al. | |
| 8,549,513 B2 | 10/2013 | Vinberg et al. | |
| 8,782,637 B2 | 7/2014 | Khalid | |
| 8,806,483 B2 | 8/2014 | Anderson, III et al. | |
| 8,832,686 B2 | 9/2014 | Smith et al. | |
| 8,843,924 B2 | 9/2014 | Dow et al. | |
| 8,909,784 B2 | 12/2014 | Ferris et al. | |
| 8,909,785 B2 | 12/2014 | Franco et al. | |
| 8,966,084 B2 | 2/2015 | Dow et al. | |
| 9,092,837 B2 | 7/2015 | Bala et al. | |
| 9,104,514 B2 | 8/2015 | Bravery et al. | |
| 9,176,773 B2 | 11/2015 | Fries et al. | |
| 9,426,030 B1 | 8/2016 | Anerousis et al. | |
| 2011/0119191 A1 | 5/2011 | Stern et al. | |
| 2011/0296429 A1 | 12/2011 | Segmuller et al. | |
| 2012/0011517 A1* | 1/2012 | Smith | H04L 41/5003 718/104 |
| 2012/0130911 A1 | 5/2012 | Maclellan et al. | |
| 2012/0304179 A1 | 11/2012 | Devarakonda et al. | |
| 2013/0013767 A1 | 1/2013 | Stober et al. | |
| 2013/0031464 A1* | 1/2013 | Mess | G06F 40/117 715/234 |
| 2013/0227349 A1* | 8/2013 | Nodir | G06F 11/0778 714/37 |
| 2014/0149591 A1* | 5/2014 | Bhattacharya | G06F 9/5072 709/226 |
| 2014/0215460 A1 | 7/2014 | Birke et al. | |
| 2014/0278820 A1 | 9/2014 | Dantuma et al. | |
| 2014/0280952 A1 | 9/2014 | Shear et al. | |
| 2016/0013992 A1 | 1/2016 | Reddy et al. | |
| 2016/0162666 A1 | 6/2016 | Casey et al. | |

OTHER PUBLICATIONS

Brauen et al., Linked Audio Representation in Cybercartography: Guidance From Animated and Interactive Cartography for Using Sound, 2008, Carleton University, p. 226+ (Year: 2008).*
Office Action for U.S. Appl. No. 15/173,273 dated Jan. 9, 2018, 28 pages.
Office Action for U.S. Appl. No. 15/173,273 dated Jul. 24, 2018, 25 pages.
Office Action for U.S. Appl. No. 15/173,273 dated Dec. 27, 2018, 26 pages.
Office Action for U.S. Appl. No. 15/173,273 dated Jul. 11, 2019, 32 pages.

* cited by examiner

FACILITATING MANAGEMENT OF COMMUNICATIONS SYSTEMS

RELATED APPLICATION

The subject patent application is a continuation of, and claims priority to, U.S. patent application Ser. No. 15/173,273, filed Jun. 3, 2016, and entitled "FACILITATING MANAGEMENT OF COMMUNICATIONS SYSTEMS," the entirety of which application is hereby incorporated by reference herein.

TECHNICAL FIELD

The subject disclosure relates generally to communications systems, and, for example, to facilitating management of communications systems.

BACKGROUND

Large companies are rapidly moving toward shared environments, comprising cloud models, where applications reside in virtual machines ("VMs") of operating systems and in application stacks that can have resources added or removed on demand, instantiated, quiesced, and re-instantiated on other peer hardware. These types of solutions provide flexibility and can optimize individual devices for maximum utilization and return-on-investment (ROI) compared to fixed hardware allocation.

Licensing terms for applications have traditionally been determined at a central processing unit (CPU) level, with the number of CPUs being considered a scalar value to compare the amount of effort the software can produce. For example, a four-way server, which is a single server with four CPUs, is considered twice as powerful as a two-way server, which is a single server with two CPUs. Such is often considered the case notwithstanding the CPUs of the two-way server may be three times as fast CPUs for the four-way server. As can be seen, this approach can be inaccurate and arbitrary, but is a heavily used model. Further, many software vendors do not acknowledge the virtual image of a VM and a physical device for the purposes of licensing software to a client company. As mentioned, CPUs can be added to or removed from a VM from time to time, or the VM can be relocated/migrated to another physical device. The introduction of a cloud solution (shared solution, farm solution) can increase this problem many orders of magnitude and can result in communication system license management issues.

DETAILED DESCRIPTION

Figure 1:
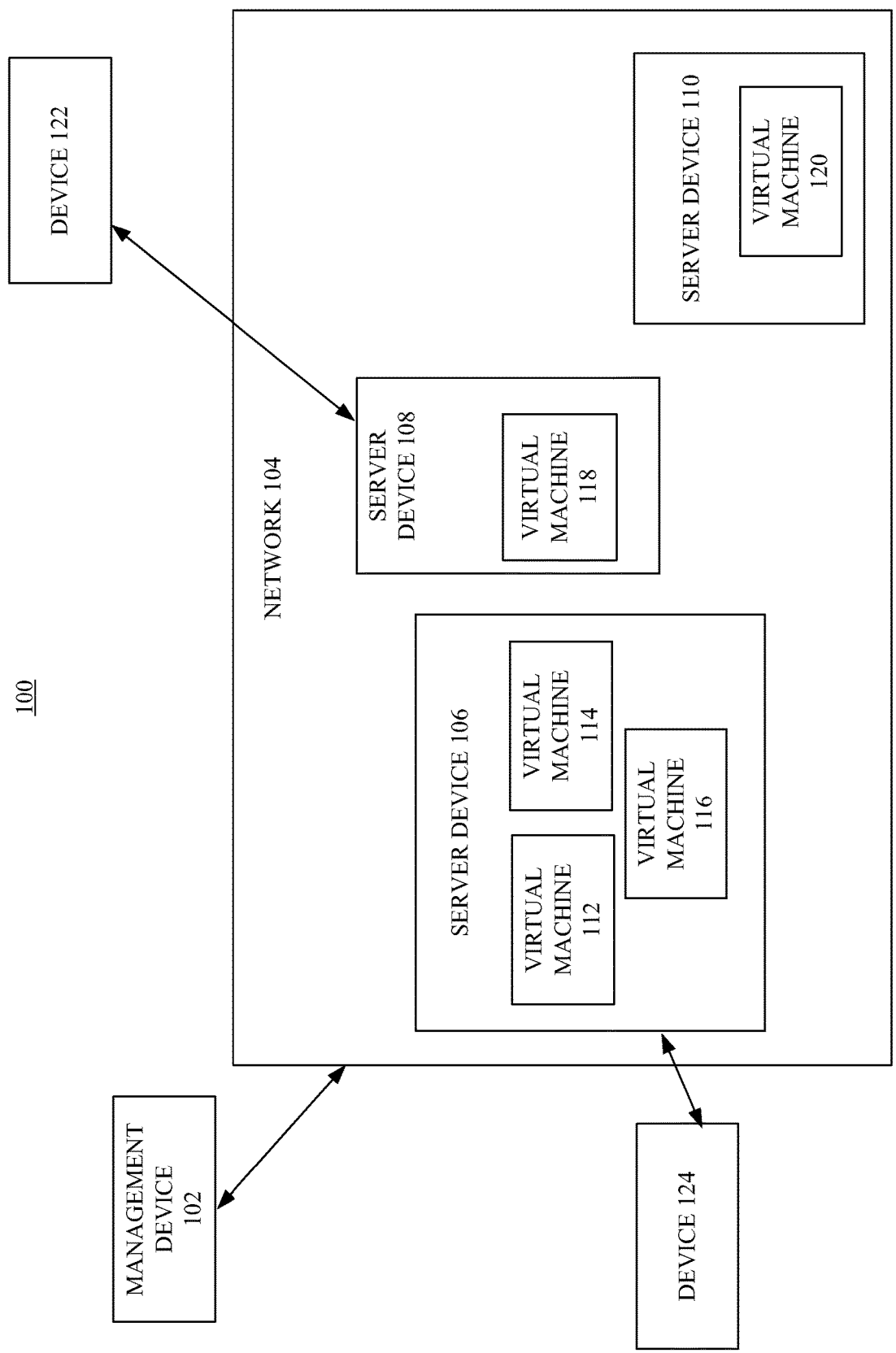
FIG. 1 illustrates an example block diagram of a communication system for which management can be facilitated in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. As used herein, the terms "server" and "server device" are interchangeable.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Large companies are rapidly moving toward shared environments, comprising cloud models, where applications reside in VMs of operating systems and in application stacks that can have resources added or removed on demand, instantiated, quiesced, and re-instantiated on other peer hardware. These types of solutions provide flexibility and can optimize individual devices for maximum utilization and ROI compared to fixed hardware allocation.

Licensing terms for applications have traditionally been determined at a CPU level, with the number of CPUs being considered a scalar value to compare the amount of effort the software can produce. For example, a four-way server, which is a single server with four CPUs, is considered twice as powerful as a two-way server, which is a single server with two CPUs. Such is often considered the case notwithstanding the CPUs of the two-way server may be three times as fast CPUs for the four-way server. As can be seen, this approach can be inaccurate and arbitrary, but is a heavily used model. Further, many software vendors do not acknowledge the virtual image of a VM and a physical device for the purposes of licensing software to a client company. As used herein, the terms "virtual machine," "virtual instance" and "instance" are interchangeable and mean a software implementation/embodiment of a physical computer or physical device. A VM can have an operating system, applications, files and the like. The term "virtual image" means an electronic copy of a VM or a virtual hard disk file that provides a template for generating a VM (but may or may not have one or more configurations of a particular VM). As mentioned, CPUs can be added to or removed from a VM from time to time, or the VM can be relocated/migrated to another physical device.

The effort to continually manage licenses can be significant and/or costly for a licensee. Further, failure to accurately manage license compliance can cause significant time, financial and/or legal penalties. Additionally, server devices previously not licensed may be inadvertently licensed due to the migration of a VM, and wasted license cost in which a whole server device is licensed for a single VM can result. Software licensing has also been historically described in terms of a physical document with legal wording, which can be subject to multiple interpretations.

The introduction of a cloud solution (or, in various embodiments, shared solution or farm solution) can increase these problems many orders of magnitude and can result in communication system license management issues. For example, licensed software has traditionally been installed on operating system (OS) instances with fixed resources. This can result in a lack of ability to accurately account for actual VMs of the licensed software, and can unfortunately result in too many licenses for actual use (and resulting excess expense) or too few licenses (and resulting inefficiencies or limitations in operation).

One or more embodiments described herein can provide systems, methods, apparatus and/or machine-readable storage media that can facilitate management of communication systems. One or more embodiments described herein can facilitate optimized VM placement in a shared/farm/cloud solution based on resource constraints (e.g., memory, disk, (CPUs)), software and/or licensing. The placement can be further optimized to improve or maximize the value of licensing, avoid legal constraints and penalties, and/or maintain accurate records of licensing within the solution. In one or more embodiments, the solution has multiple components, comprising generation of resource solutions and VM placement, generation and output of licensing information as business rules and the like. In one embodiment, an industry standard for expressing software licensing as business rules is proposed.

In one embodiment, a method is provided. The method comprises: processing, by a device comprising a processor, first information representative of human-readable language and indicative of terms of agreements associated with respective software for a communication system, wherein the communication system is arranged according to a first configuration of virtual machines and server devices, and wherein the agreements comprise license agreements for the respective software; and converting, by the device, the first information into machine-readable rules indicative of the terms of the agreements associated with the respective software for the communication system. The method can also comprise: based on a result of comparing the machine-readable rules and first information indicative of the first configuration, determining, by the device, whether the first configuration of the communication system satisfies a defined criterion.

In another embodiment, another method is provided. The method comprises: processing first information configured in human-readable language and indicative of terms of a first legal agreement; and converting the first information into machine-readable rules indicative of the terms of the first legal agreement, wherein the machine-readable rules are from an industry standard that comprises a protocol interpreting agreement model and identifying translation rules for converting agreement information to machine-readable rule information, and wherein different agreement information is associated with different machine-readable rules.

In another embodiment, a machine-readable storage medium is provided. The machine-readable storage medium can comprise executable instructions that, when executed by a processor, facilitate performance of operations. The operations comprise: processing first information configured in human-readable language and indicative of terms of compliance agreements for a communication system, wherein the communication system is arranged according to a configuration of virtual machines and server devices; converting the first information into machine-readable rules indicative of the terms of the compliance agreements for the communication system; and determining whether the configuration of the communication system satisfies a defined criterion based on comparing the machine-readable rules and first information indicative of the configuration.

One or more embodiments can advantageously avoid or reduce the likelihood of or cost resultant from unnecessary software licensing, increase the likelihood of maximizing the value of existing licenses by strategic placement of software deployments within the shared/farm/cloud solutions and/or enable portability across different solutions (e.g., across different configurations of VMs, software and/or under different licensing regimes). Further, one or more embodiments can simplify complex legal language and indicate it as machine-readable rules thereby reducing or removing ambiguity or variation that may occur in the legal documentation and/or in the human interpretation of the legal document. One or more embodiments, can also facilitate vendor software license provisioning as business rules in lieu of legal jargon.

One or more embodiments can avoid or reduce the likelihood of encountering or violating specific governmental issues based on location (e.g., cloud networks may span national boundaries). One or more embodiments can result in optimized resource utilization, which can be more cost effective for cloud environments.

Turning now to the drawings, FIG. 1 illustrates an example block diagram of a communication system for which management can be facilitated in accordance with one or more embodiments described herein. In various embodiments, the system 100 can employ the management device 102 to facilitate recommendation of placement of one or more VMs relative to one or more server devices based on resources, to facilitate improvement or maximization of licensing value and/or to ensure the requisite number of licensing are obtained while ensuring excess licensing does not result. The management device 102 can also generate language (e.g., mark-up language) for simplifying complex human-readable language of licensing agreements (and other types of agreements) by translating it into machine-readable business rules. Other types of agreements comprise, but are not limited to, compliance agreements, legal agreements generally (which are not limited to licensing agreements) and contact agreements generally.

As shown in FIG. 1, system 100 comprises a combination of server devices and VMs communicatively coupleable to various devices that can be accessed by one or more users or other devices. Software can be licensed for the server devices and/or the VMs in various embodiments and use of such would be pursuant to a licensing agreement. In FIG. 1, shown are server devices 106, 108. Server device 106 is associated with VMs 112, 114, 116 (e.g., VMs 112, 114, 116 are installed on server device 106, for example), server device 108 is associated with VM 118 and server device 110 is associated with VM 120. The server devices 106, 108, 110 can reside in any number of different types of networks (e.g., such as network 104) and can also be communicatively coupled to one another across multiple different networks.

In different embodiments, network 104 can be or comprise a wide area network (WAN) (e.g., Internet), a local area network (LAN) or the like. In some embodiments, network 104 can be or comprise a cloud network. Accordingly, one or more of server devices 106, 108, 110 can be part of or comprised in the cloud network and can provide one or more services to devices 122, 124. Numerous different applications can be provided or accessed on-demand by the devices 122, 124 via the VMs 112, 114, 116, 118, 120 comprising, but not limited to, applications related to security, data analytics, file or information storage and the like. In some embodiments, two or more VMs (associated with the same or different server devices) can provide the same application or service. In other embodiments, one or more, or, in some embodiments, each, VM of FIG. 1 can provide a different application or service. In the embodiment shown, device 124 accesses an application or service from server device 106 while device 122 accesses an application or service from server device 108. From time to time, the devices 122, 124 can be re-allocated to different ones of server devices 106, 108, 110 based on demand, resources, application requested and the like.

Further, in various different embodiments, the VMs 112, 114, 116, 118, 120 can be flexibly allocated/re-allocated/ migrated from one server device to another server device of FIG. 1 to obtain technical efficiencies, meet demand and/or based on licensing requirements that may be resultant from software vendors associated with the services provided via the VMs 112, 114, 116, 118, 120. For example, while VM 112 is shown in FIG. 1 as allocated to server device 106, from time to time, VM 112 can be re-allocated to server device 108 or server device 110.

Management device 102 can be configured to manage one or aspects within system 100 and generate information associated with components of system 100. Management device 102 will be described in greater detail with reference to FIGS. 2, 3, 4, 5 and 6.

Figure 2:
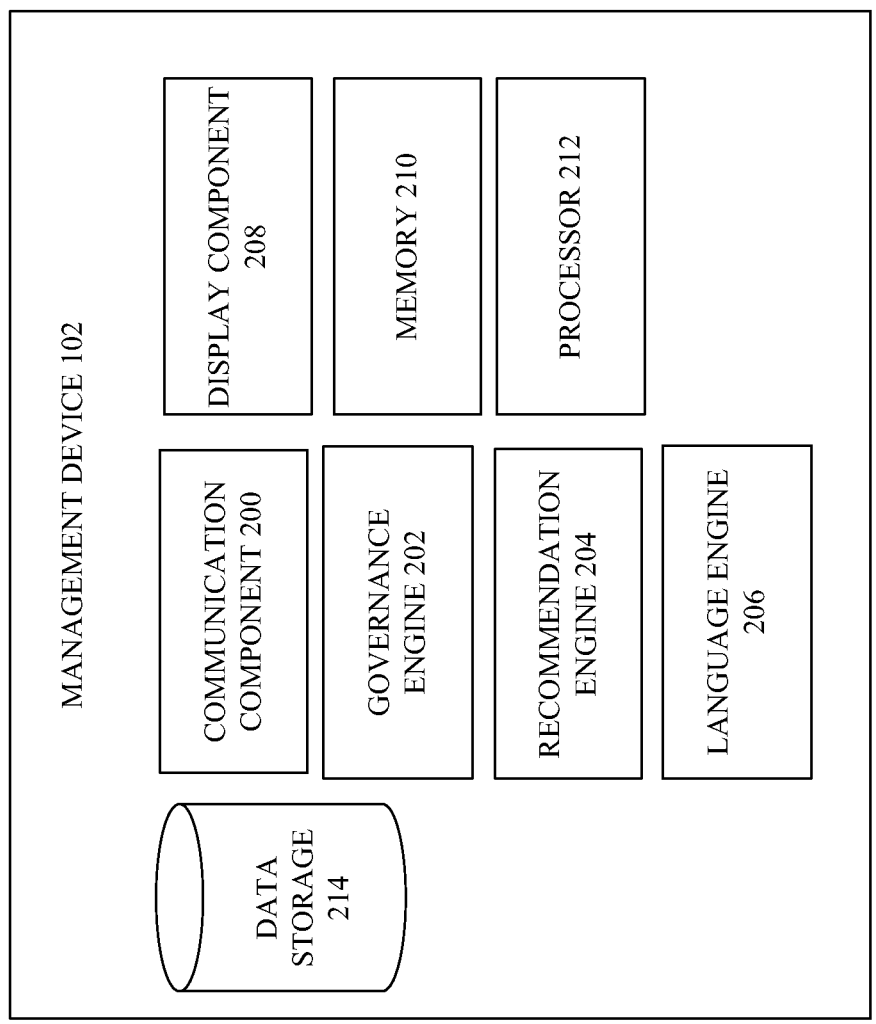
FIG. 2 illustrates an example block diagram of a management device configured to facilitate management of communication systems in accordance with one or more embodiments described herein.

FIG. 2 illustrates an example block diagram of a device of the system of FIG. 1 and configured to facilitate management of communication systems in accordance with one or more embodiments described herein. Repetitive description of like elements employed in other embodiments described herein is omitted for sake of brevity.

Management device 102 can comprise communication component 200, governance engine 202, recommendation engine 204, language engine 206, display component 208, memory 210, processor 212 and/or data storage 214. In various embodiments, one or more of communication component 200, governance engine 202, recommendation engine 204, language engine 206, display component 208, memory 210, processor 212 and/or data storage 214 can be electrically and/or communicatively coupled to one another to perform one or more functions of management device 102.

The communication component 200 can transmit and/or receive information to and/or from one or more of the server devices 106, 108, 110 and/or to and/or from one or more of the VMs 112, 114, 116, 118, 120. In some embodiments, the information received or obtained by the communication component 200 can comprise information such as licensing, compliance and/or contract agreement terms, information regarding resources associated with one or more server devices or VMs of the system 100 of FIG. 1. For example, the agreement terms can be received in human-readable language in some embodiments and therefore may be complex and/or have terms that may be interpreted in different ways by different readers of the agreement.

Resources for a VM and/or a server device (which can dictate or be associated with licensing terms) can comprise, but are not limited to, CPUs, cores, memory, connections, storage and the like. In some embodiments, information obtained and/or received by the communication component 200 can be or comprise information about the placement of one or more VMs in association with a server device, options for migrating a VM to a different server device and the like. The communication component 200 can output or transmit information comprising, but not limited to, machine-readable business rules/information generated from processed/ translated human-readable agreement terms, recommendations for placement and/or location of software relative to server devices or VMs, licensing terms or the like, instructions for migration of a VM from one server device to another server device or the like. In various embodiments, where applicable, the information received by and/or transmitted from the communication component 200 can be text, pictorial/image, audio or the like. In some embodiments, the human-readable text of the agreements (and therefore the translated machine-readable rules) are a function of resources used to qualify license agreements and software of the respective software for the VMs. Different agreement information can map to and be associated with different machine-readable rules, for example.

Display component 208 can output graphical or textual or audio information such as a configuration of one or more different VMs for association with one or more different server devices, machine-readable rules generated based on human-readable language obtained or received by the management device 102.

The memory 210 can be a machine-readable storage medium storing computer-executable instructions to perform one or more of the functions described herein with reference to the management device 102. For example, in some embodiments, the memory 210 can store translation rules associated with generating business rules from human-readable language, human-readable language of agreements (e.g., licensing, compliance, contract or legal agreements), information describing candidate placement of one or more VMs relative to one or more server devices, information dictating when to not recommend a requested configuration of VMs and server devices and the like. The processor 212 can perform one or more of the functions described herein with reference to the management device 102. The functions can comprise, but are not limited to, those for which machine-readable storage media is provided via memory 210, evaluation of one or more resources or software, evaluation of license terms and the like. As such, data storage 214 can store information for use by the memory 210 and processor 212 comprising, but not limited to, language of agreements, resources of one or more VMs or server devices, business rules, rules for placement of VMs, licensing terms and the like.

Figure 3:
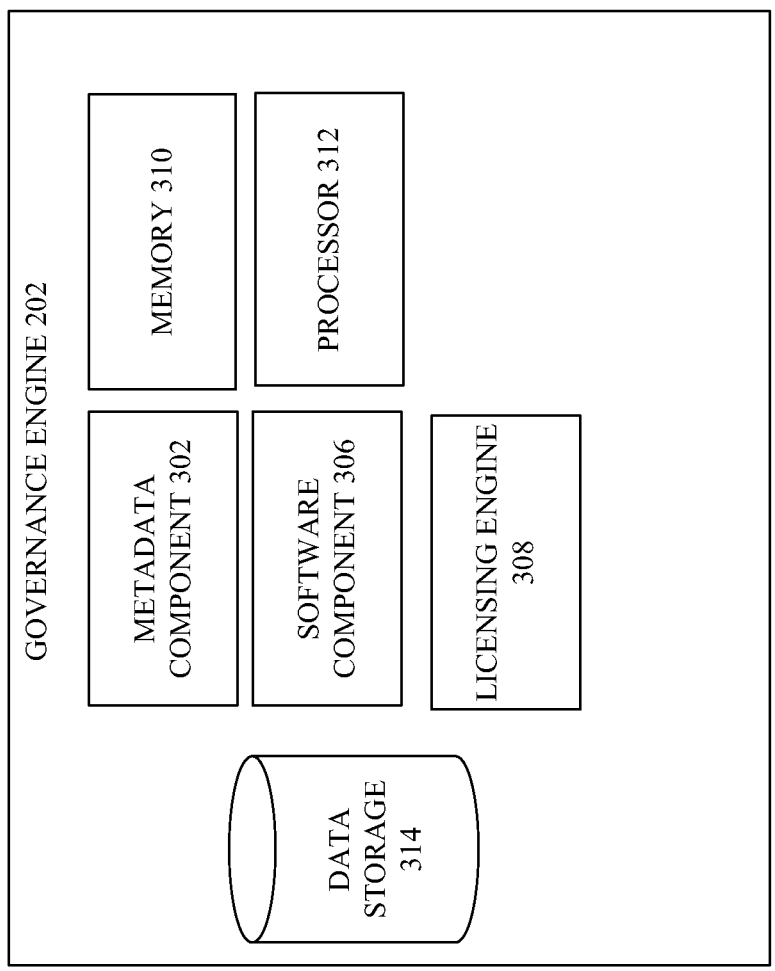
FIG. 3 illustrates an example block diagram of a governance engine configured to facilitate management of communication systems in accordance with one or more embodiments described herein.

Governance engine 202 will be described in greater detail with reference to FIG. 3. FIG. 3 illustrates an example block diagram of the governance engine 202, which is configured to facilitate management of communication systems in accordance with one or more embodiments described herein. Repetitive description of like elements employed in other embodiments described herein is omitted for sake of brevity.

Governance engine 202 can comprise metadata component 302, software component 306, licensing engine 308, memory 310, processor 312 and/or data storage 314. In various embodiments, one or more of metadata component 302, software component 306, licensing engine 308, memory 310, processor 312 and/or data storage 314 can be electrically and/or communicatively coupled to one another to perform one or more functions of governance engine 202.

Metadata component 302 can be configured to comprise, process and/or generate metadata descriptive of one or more resources (e.g., CPU, RAM, etc.) of one or more server devices and/or one or more VMs in the communication system managed by management device 102. The software component 306 can comprise information about the software installed on the server devices and/or VMs. By way of example, but not limitation, the information can be or comprise the name and functionality of the software, the necessary resources for operation of the software, the time duration during which the software can be used, the number of server devices and/or VMs on which the software can be used simultaneously or the like. For example, a manifest of one or more software applications, including one or more (or, in some embodiments, all) dependent software applications, can be installed on a server device, VM and/or one or more other host devices). In some embodiments, a commercially available software solution can include open source software. In some embodiments, this open source software could also be included in this manifest.

The licensing engine 308 can comprise information about the licensing information or terms related to the software assigned to one or more of the server devices and/or one or more of the VMs. In some embodiments, the licensing engine 308 can receive inputs indicative of one or more human-readable agreement terms. In some embodiments, the licensing engine 308 can generate and/or assign a value to the licensing agreement. In some embodiments, the value can be a relative scaled value indicative of or associated with the applicability of a defined term to a particular agreement. In various embodiments, different agreement characteristics may lend themselves to a variety of ranking techniques. Once the value is established, one or more aspects of the software can be compared to an existing agreement. A determination can be made as to whether the software is covered within the scope of the agreement.

The memory 310 can be a machine-readable storage medium storing computer-executable instructions to perform one or more of the functions described herein with reference to the governance engine 202. For example, in some embodiments, the memory 310 can store machine-readable storage media associated with evaluating resources, software and the like. The processor 312 can perform one or more of the functions described herein with reference to the governance device 202. As such, data storage 314 can store information for use by the memory 310 and processor 312 comprising, but not limited to, agreement terms, resource and software information and the like.

Figure 5:
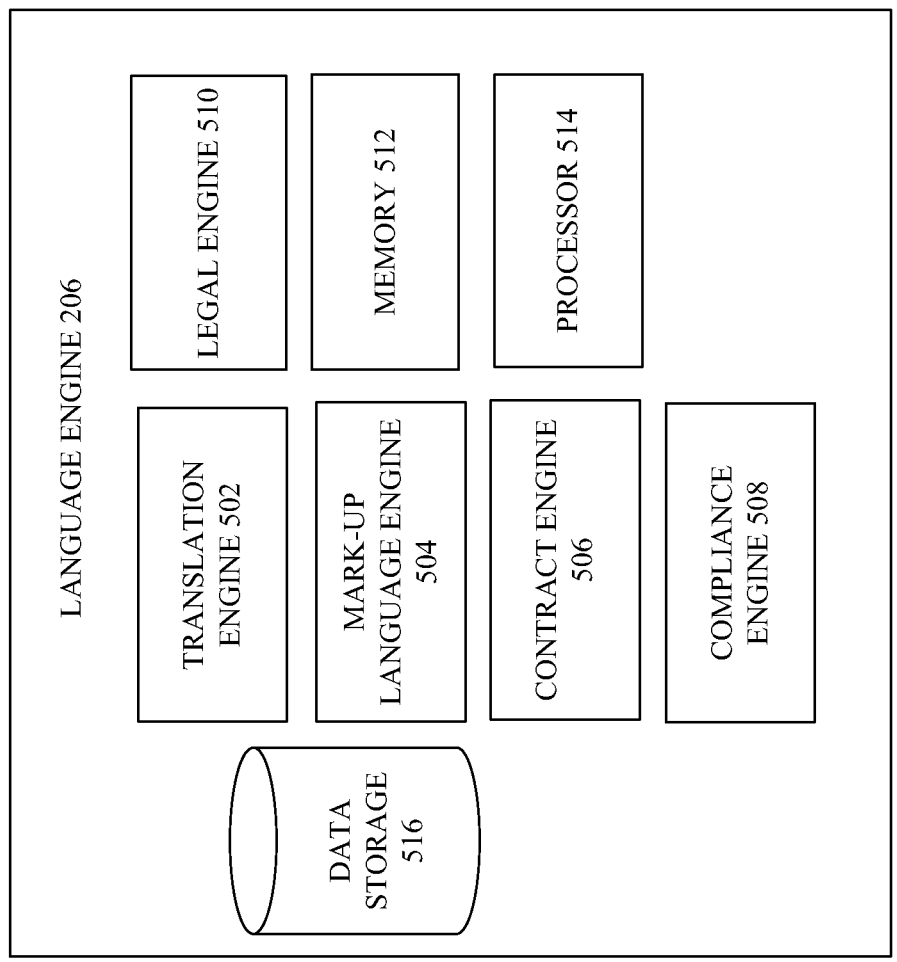
FIG. 5 illustrates an example block diagram of a language engine configured to facilitate management of communication systems in accordance with one or more embodiments described herein.

Language engine 206 will be described in greater detail with reference to FIG. 5. FIG. 5 illustrates an example block diagram of language engine 206, which is configured to facilitate management of communication systems in accordance with one or more embodiments described herein. Language engine 206 can comprise translation engine 502, mark-up language engine 504, contract engine 506, compliance engine 508, legal engine 510, memory 512, processor 514 and/or data storage 516. In various embodiments, one or more of translation engine 502, mark-up language engine 504, contract engine 506, compliance engine 508, legal engine 510, memory 512, processor 514 and/or data storage 516 can be electrically and/or communicatively coupled to one another to perform one or more functions of the language engine 206.

Translation engine 502 can receive and process human-readable information and translate the human-readable information into machine-readable information. Any number of different principles can be employed to generate the different rules (e.g., as relates to the software assigned to the VMs and/or server devices). Further, in some embodiments, for example, the translation engine 502 can scan or otherwise capture or obtain information including in or associated with an agreement. The translation engine 502 can scan or otherwise capture or obtain information about legal terms of the agreement. In some embodiments, the translation engine 502 can include a component for receipt of human intervention and/or adjustment of one or more operations of the translation engine 502. In various embodiments described herein two or more different agreements can be evaluated using as much consistency between agreements as possible. The agreements can be interpreted by the rules set to create the agreement metadata.

The rules can be employed in any number of different ways. By way of example, but not limitation, the rules can be employed to generate a recommended license. As another example the rules can be employed to determine various aspects of a recommended license. In some embodiments, the rules can translate information to license terms.

By way of example, but not limitation, an industry wide set of rules can be adopted. Accordingly, one or more, or in some embodiments, all future agreements with a wide variety of vendors can be standardized to embody characteristics that can be directly translatable to agreement metadata.

In some embodiments, a licensing agreement can be received and analyzed. A standardized set of metadata can then be generated from the licensing agreement. The licensing agreement can be compared (one or more times) with the hosts to verify compliance, take inventory prior to negotiations, etc.

As such, the human-readable information input to or received by translation engine 502 can be interpreted and machine-readable information can be generated and/or output. For example, the translation engine 502 can be configured with rules and information for translating agreement terms and/or words or values (e.g., dollar values, memory requirements, licensing cost, licensing duration) in an agreement into terms and/or word that can be processed and/or discerned by a computer or other machine. The translation engine 502 can be configured to apply any number of rules to convert from one language to another language. Different types of agreements can also be translated. For example, the contract engine 506 can generate translations for a number of different types of contracts (other than licensing agreements). The compliance engine 508 can generate translations related to compliance rules including, but not limited to, communication system and federal communication commission (FCC) compliance and the like. The legal engine 510 can provide translation rules for any number of different types of legal requirements or measures. The mark-up language engine 504, the contract engine 506 and/or the compliance engine 508 can perform one or more of the same or different relative functions in different embodiments as described herein but be specialized to perform that function on their respective components. The mark-up language engine 504 can store and/or access a repository or dictionary employed by the contract engine 506 and/or the compliance engine 508. The contract engine 506 can obtain or access the repository and/or dictionary and/or evaluate one or more contracts and/or convert the contracts into a standardized document for consistent reference across multiple different documents. The compliance engine 508 can perform the watchdog function for both the vendor and customer assuring compliance is maintained.

In some embodiments, the translation engine 502 can be configured to translate information communicated in a language to a single structured data, which may be in the same language as the source. As such, an electronic dictionary and/or glossary of human-readable words can be stored in or accessible by translation engine 502 and/or data storage 516 for use in translating the human-readable language to human-readable legal terminology, for example. In one example, a document may state "anyone can do this" wherein the legally appropriate language can be "someone skilled in the art can replicate". The translation engine 502 can scan and/or otherwise determine a document or other information states "anyone can do this . . . " and output "someone skilled in the art can replicate . . . ".

As another example, contractually appropriate but potentially ambiguous phrases can be included in a document (e.g., the term of the contract can be indicated "from 1/1/2016 to 12/31/2016" or equivalent "the calendar year 2016" or just "2016," in three different documents or in three locations within the same document. The translation engine 502 can obtain and/or receive the different phrases and generate standardized language (e.g., the translation engine 502 can output a standard field similar to "duration" with sub fields "start" value "1/1/2016 00:01 GMT", and "end" value "12/31/2016 23:59 GMT"). These values can then be utilized by the engines for various activities relative to the current, past, or future evaluations of software utilization and placement. The eventual goal would be that vendors agree (or are imposed upon) to include a standardized format (e.g., duration.start and duration.end) in the contracts presented electronically or physically to remove ambiguity and expedite interpretation. In some embodiments, the output generated from the translation engine 502 can be the machine-readable rules.

In some embodiments, translating from human-readable language to machine-readable language can include two layers. For example, machine documented pattern matching-driven interpretation can be provided in a first layer. The second layer can include statutory interpretation by humans for any rules that are ranked as having a lower margin of confidence by the first layer. The layers are employed to augment each other and exist together. In some embodiments, neither layer can exist without the other layer.

A mark-up language engine 504 can also be included. The mark-up language engine 504 can be configured to apply or generate an industry standard license markup language. The industry standard license mark-up language can be created by or employed by mark-up language engine 504 to perform translations in some embodiments.

The mark-up language engine 504 can provide a consistent (or substantially consistent) way of defining an abstract construct for subsequent storage or presentation. For example, in one embodiment, the mark-up language engine 504 can employ standard and non-standard terms or aspects from an agreement and codify those terms or aspects into a representation of that agreement.

In various embodiments, the industry standard mark-up language can comprise a protocol identifying translation rules for converting agreement information to machine-readable rules. In some embodiments, the markup language can be expanded to describe the resources of server devices and/or VMs, as well as the software contained within the VMs, which can be combined with the licensing within the language engine to perform the evaluation and generate the recommendation.

In some embodiments, a second type of mark-up language engine 504 can be developed that can take into account the type of platform, the resources used to qualify the license (e.g., CPU, RAM, disk, connections) and combine the resources with other licenses for software to properly select one or more agreements and/or combine one or more agreements. In some embodiments, the second type of mark-up language engine 504 (or a resultant protocol for the language) can be or become an industry standard so that any agreement can be consistently evaluated for negotiation, recorded for compliance and/or measured against the execution of the agreement.

The memory 512 can be a machine-readable storage medium storing computer-executable instructions to perform one or more of the functions described herein with reference to the language engine 206. For example, in some embodiments, the memory 512 can store machine-readable storage media associated with generating business rules, evaluating of resources and software and the like. The processor 514 can perform one or more of the functions described herein with reference to the language engine 206. As such, data storage 516 can store information for use by the memory 512 and processor 514 comprising, but not limited to, information for converting between human-readable language and machine-readable rules and the like.

Figure 4:
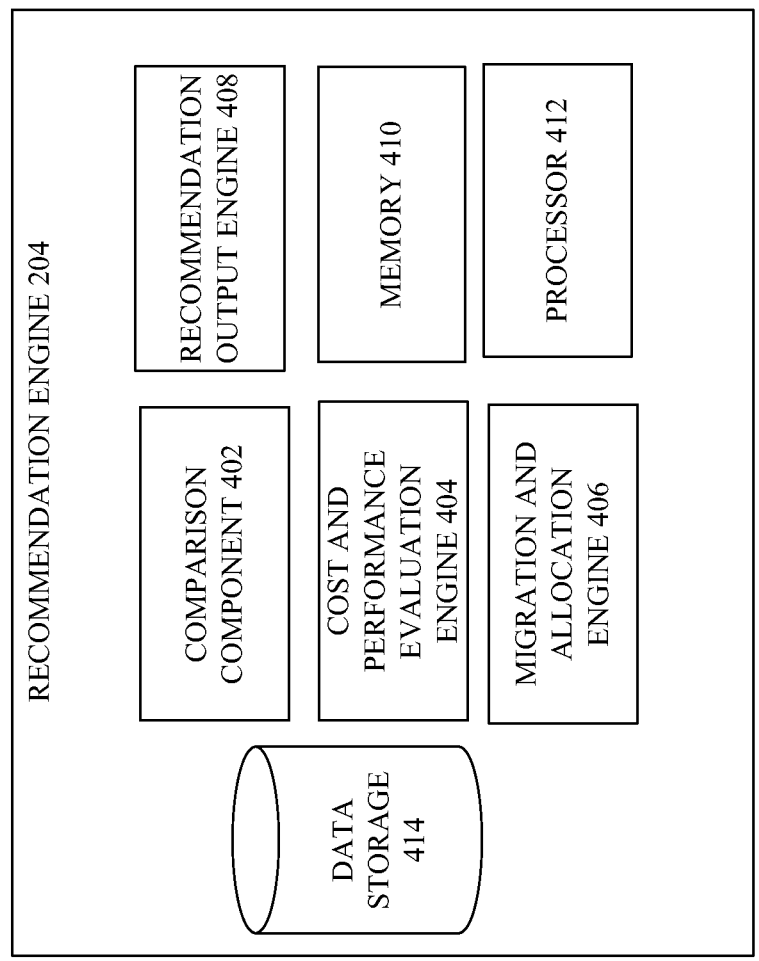
FIG. 4 illustrates an example block diagram of a recommendation engine configured to facilitate management of communication systems in accordance with one or more embodiments described herein.

Recommendation engine 204 will be described in greater detail with reference to FIG. 4. FIG. 4 illustrates an example block diagram of the recommendation engine 204, which is configured to facilitate management of communication systems in accordance with one or more embodiments described herein. Recommendation engine 204 can comprise comparison component 402, cost and performance evaluation engine 404, migration and allocation engine 406, recommendation output engine 408, memory 410, processor 412 and/or data storage 414. In various embodiments, one or more of comparison component 402, cost and performance evaluation engine 404, migration and allocation engine 406, recommendation output engine 408, memory 410, processor 412 and/or data storage 414 can be electrically and/or communicatively coupled to one another to perform one or more functions of recommendation engine 204.

In some embodiments, the software for a new VM created (or planned) can be determined by the software component 306 of FIG. 3 while a value can be assigned to the license associated with the software by the licensing engine 308. The comparison component 402 of FIG. 4 can compare the software and licensing value for the new VM to software and licensing values pre-existing prior to creation (or plan) of the new VM and generate a comparison value or comparison information describing how the two sets of information compare. Different components can be employed to generate the license value. Further, software of a new VM can be compared to software of existing VMs employing a number of different approaches. For example, in some embodiments, each product instance (or one or more product instances) of the software would have a Price×Quantity (P×Q) algorithm that would be applied to determine the financial impact of changes to the technical components of the system. A report can be generated and/or constant tracking (or tracking at one or more intervals of time) can be performed. Such can facilitate improvement of license management based on the information tracked and/or the report generated. New license models can be based on amount of time used and the above-referenced tracking can be employed to manage license compliance. One or more of the report generation and/or the tracking (or the analysis of the tracked information or report) can be performed by one or more components or systems described herein.

From an engineer's standpoint, for example, tremendous time can be spent assessing and/or counting implementations of software or components and providing information to contract negotiators. One or more embodiments described herein can allow a constant tracking of execution against licensing requirements in a consistent manner across all (or, in some embodiments, one or more) platforms and/or applications.

The recommendation output engine 408 can generate and/or output a placement recommendation for the new VM and/or for one or more of the VMs of the system based on the comparison. In one embodiment, if the cost and performance evaluation engine 404 determines that there is only one server device already licensed for a particular software, and there are one or more VMs installed on that server device not using that particular software, the cost and performance evaluation engine 404 can determine whether the cost to migrate those VMs off the server device to load a new virtual image is less than or greater than the cost to license another server device. If the cost to migrate those VMs off the server device to load a new virtual image is less than the cost to license another server device, the cost and performance evaluation engine 404 can output a first defined signal causing the recommendation output engine 408 to generate information that those VMs are to be migrated to another server device so the new VM can be placed on the server device. By contrast, if the cost and performance evaluation engine 404 determines that the cost to migrate those VMs off the server device to load a new virtual image is greater than the cost to license another server device, the cost and performance evaluation engine 404 can output a second defined signal and the recommendation output engine 408 can generate information indicative of a recommendation to license another appropriate server device in the solution and install the VM on the newly-licensed server device. Different types of comparisons, including, but not limited to, cost, performance, legality, etc. can be employed to generate a comparison and corresponding recommendation. The migration and allocation engine 406 can determine and/or plan or generate information for migration/allocation of a VM to one or more different server devices.

In some embodiments, with a newly-licensed server device, the entire solution (e.g., the entire set of VMs and server devices, or a set of one or more VMs and/or server devices) can be re-evaluated by the recommendation engine 204 and a determination can be made as to whether there would be a benefit or value in the migration of other pre-existing VMs with that particular software to the newly-licensed server device.

To perform re-evaluation, in some embodiments, there can be an ongoing metering of licenses against installations of applications mentioned previously. For example; if one or more embodiments of systems or components described herein can determine or otherwise access or know that a license is charged by the ESX host processor count, a design can be determined that includes more VMs with that application installed into that ESX host, we could optimize the license costs for the enterprise.

In some embodiments, the re-evaluation can comprise a determination of the relative performance of new server devices added to the solution. As such, the cost and performance evaluation engine 404 can estimate cost and/or performance of a solution with one or more newly-added server devices with various associated permutations of possible software and/or resources.

In another embodiment, the recommendation output engine 408 can recommend which, if any, and/or which type of, licenses should be added to a server device and/or which VMs should migrate to or from a server device to gain the best or at least a minimum value for licensing. For example, the recommendation output engine 408 can generate information about the type, terms and/or number of licenses to add to avoid operations that do not comprise a sufficient number or type of licenses and the like. In some embodiments, the server device can be a new server device added with three times the CPU speed but the same number of CPUs as another pre-existing server device.

As new shared computing models become available, new licensing models can also be generated, developed or applied, which can utilize flexibility in the recommendation output engine 408. In some embodiments, an understanding of the software and/or technical environment can be or is desired to be understood. In some embodiments, therefore, each vendor or supplier (or, in some embodiments, one or more vendors or suppliers) can modify the names of the products but the basic intellectual property does not typically change (and, in some embodiments, the manner in which the vendor or supplier sells its respective licenses) does not typically change. One or more embodiments described herein can allow for creation, improvement and/or implementation of constant tracking to meet (or improve the likelihood of meeting) each vendor or supplier license compliance requirement.

In various embodiments, the recommendation output engine 408 can generate a recommendation for the VMs, the server devices and/or the respective software in the communication system based on determining whether a configuration of the VMs, server devices and/or software satisfy a defined criterion. By way of example, but not limitation, the defined criterion can be associated with enhancing respective values of the software licenses. For example, the recommendation output engine 408 can generate the recommendation for the second configuration of the virtual machines, the server devices and the respective software by generating a second configuration of the communication system comprising migration of at least one virtual machine from a first server device of the server devices to a second server device of the server devices based on a determination that the first configuration of the communication system fails to satisfies the defined criterion relative to the enhancing the values of the software licenses.

In some embodiments, the recommendation output engine 408 can identify a selected number of license agreements to satisfy a defined criterion for the communication system. In some embodiments, the defined criterion is associated with maintaining licensing cost below a defined value while obtaining a defined resource utilization level. In some embodiments, the defined criterion is associated with avoiding a legal penalty while obtaining a defined resource utilization level.

The recommendation output engine 408 can also report information about the financial and resource impact of utilizing a selected number of the license agreements. For example, the recommendation output engine 408 can estimate and/or predict the financial and/or resource impact of utilizing a particular number of licenses of a particular type, having a particular value or cost, etc.

In various embodiments, the defined criterion can be associated with reducing a likelihood of a legal penalty associated with a violations of the software licenses or associated with reducing a cost of the communication system. In some embodiments, the recommendation output engine 408 can generate or recommend a new configuration of a communication system that is different from a first configuration of the communication system. For example, with reference to the system 100, the recommendation output engine 408 can generate a re-arranged version including one or more of the VMs (or additional VMs) and/or one or more of the server devices (or additional server devices). Software can be added or otherwise modified as well. The VMs can be migrated to one or more different server devices in some embodiments.

In some embodiments, the recommendation output engine 408 can generate a notification that a particular configuration is not a recommended configuration. For example, the configuration may not be recommended due to excess cost of such licensing agreement, violation of an existing license agreement, insufficiency of a licensing agreement, resultant excess number of licensing agreements or the like. In some embodiment, the notification can be output by the display component 208 and/or transmitted over a network to another location remote from the management device 102.

Figure 6:
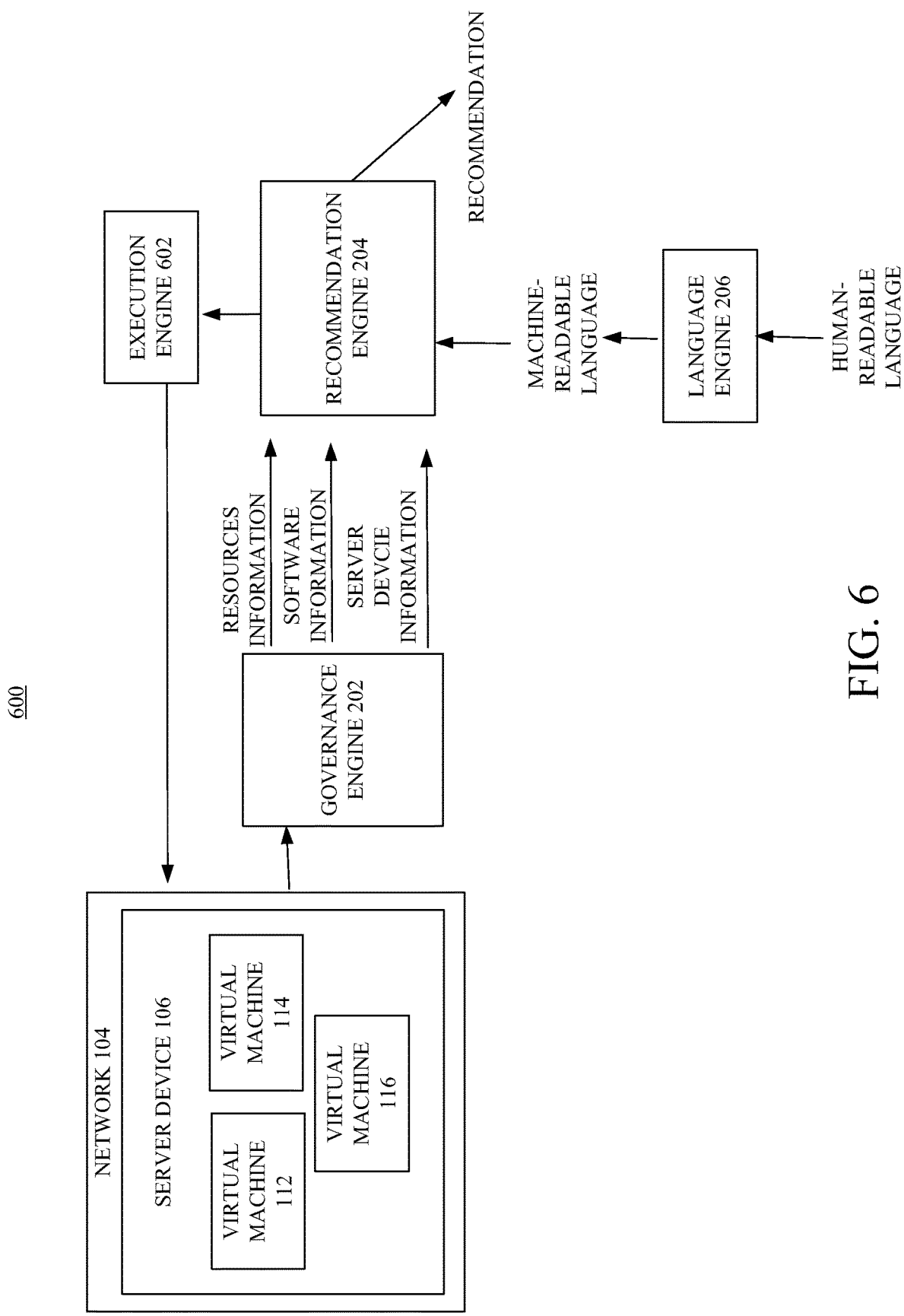
FIG. 6 illustrates an example block diagram of a system configured to facilitate management of communication systems in accordance with one or more embodiments described herein.

In some embodiments, the management device 102 can generate one or more signals to facilitate execution of a particular configuration based on a determination that the first configuration satisfies the defined criterion. For example, the management device 102 can generate information for causing the re-configuration of the communication system and/or for generating information that can be employed to setup the configuration. In FIG. 6, the execution component 602 can receive information from the recommendation engine 204 and generate one or more signals that can facilitate and/or cause one or more installations or re-configurations to be installed or requested.

Referring back to FIG. 4, in some embodiments, the defined criterion is associated with locale-specific restrictions for the terms. In some embodiments, the management device 102 can interpret locale-specific (e.g., state, nation, international) restrictions or expansions of licensing terms. By way of example, but not limitation, the network 104 can be cloud network limited to one or more geographical areas. The recommendation engine 204 can generate a recommendation limiting a configuration of VMs and server devices used in the network to those within the geographical area. By way of another example, a license for software can have a term limiting the software to a geographical area and the recommendation engine 204 can generate a recommendation limiting a configuration of software to those VMs and server devices associated with the approved geographical area.

The recommendation engine 204 can interpret the current operational environment resource utilization and make a recommendation based on the utilization level, in some embodiments. The recommendation engine 204 can provide one or more different recommendations to meet, exceed and/or not exceed a desired resource utilization level, in various different embodiments.

In some embodiments, the management device 102 can interpret license models. With the growth of cloud and the suppliers resulting in a change in license models it's important to be able to modify the engine to encompass these changes. Accordingly, the management device 102 can be modified from time to time to encompass and/or execute according to different models that develop from time to time.

In some embodiments, the management device 102 can accept requests to change one or more aspects of the communication system, perform an analysis and make a recommendation accordingly based on software licensing terms, costs, resource utilization or the like. In some embodiments, the recommendation output engine 408 can generate and/or implement the change requests in a license-optimized manner.

The memory 410 can be a machine-readable storage medium storing computer-executable instructions to perform one or more of the functions described herein with reference to the recommendation engine 204. For example, in some embodiments, the memory 410 can store machine-readable storage media associated with comparing cost and performance of VMs, determining placement of VMS relative to server devices and the like. The processor 412 can perform one or more of the functions described herein with reference to the recommendation engine 204. As such, data storage 414 can store information for use by the memory 410 and processor 412 comprising, but not limited to, rules for placement of VMs, cost and performance information, resource information and the like.

Accordingly, in some embodiments, the governance engine 202 can receive information indicative of a proposed or planned configuration of one or more VMs with various defined software, resources and associated with one or more server devices. The recommendation engine 204 can evaluate the one or more licenses proposed to provide for the configuration and an output can be generated that indicates whether the proposed or planned configuration would be allowed or legally authorized under the one or more server devices. For example, the governance engine 202 can receive the software, license and resources information as well as the proposed or planned configuration. The language engine 206 can convert the human-readable language of the license to machine-readable rules able to read by the language engine 206. The recommendation engine 204 and governance engine 202 can employ the machine-readable rules to generate an output indicating whether the planned or proposed configuration is recommended, allowed, etc. and/or suggest modifications to the. planned configuration such that the same is legally authorized In some embodiments, the recommendation engine 204 can suggest types of licenses to obtain to have the minimal cost outlay for licenses to obtain the desired configuration. The recommendation engine 204 can also, in some embodiments, suggest modified configurations that are covered by the one or more licenses and also satisfies one or more defined conditions (e.g., licensing cost less than or equal to a defined value, obtaining a defined set of resources and/or performance). Additionally, a markup language can describe the resources of physical and VMs, as well as the software contained within, which can be combined with the licensing within the engine to create the correct recommendation.

In some embodiments, the management device 102 can process first information configured in human-readable language and indicative of terms of a first legal agreement. The management device 102 can also convert the first information into machine-readable rules indicative of the terms of the first legal agreement, wherein the machine-readable rules are comprised in a set of machine-readable rules comprised in an industry standard that comprises a protocol interpreting agreement models and identifying translation rules for converting agreement information to machine-readable rules, wherein different agreement information is associated with different machine-readable rules.

In some embodiments, the management device 102 can process first information configured in human-readable language and indicative of terms of compliance agreements for a communication system, wherein the communication system is arranged according to a first configuration of virtual machines and server devices. The management device 102 can also convert the first information into machine-readable rules indicative of the terms of the compliance agreements for the communication system. In some embodiments, the management device 102 can also determine whether the first configuration of the communication system satisfies a defined criterion based on comparing the machine-readable rules and first information indicative of the first configuration. In some embodiments, the management device 102 can generate a recommendation for the communication system based on the determining.

FIG. 6 illustrates an example block diagram of a system configured to facilitate management of communication systems in accordance with one or more embodiments described herein. Repetitive description of like elements employed in other embodiments described herein is omitted for sake of brevity.

As shown in system 600, resource information, server device information and/or software information is obtained via governance engine 202 based on the configuration of network 104. In the embodiment shown, the resource information, server device information and/or the software information are determined by governance engine 202 (in some embodiments, this information can be received from a user or other device). In some embodiments, the resource information and/or the software information can be requested and/or planned or candidate resources and software for a potential or candidate system under consideration. While network 104 is shown including only server device 106 and VMs 112, 114, 116, in various embodiments, any number of server devices and/or VMs can be included in network 104 in any number of configurations of server device-VM combinations (e.g., any number of VMs being installed on the server devices or server devices having no VMs installed).

The recommendation engine 204 can receive the resource information, server device information and/or software information and also receive machine-readable language representative of one or more licensing agreements for software associated with the VMs and/or server devices of the network 104 (or for a planned or candidate network). The recommendation engine 204 can output a recommendation for a configuration of the network 104 based on any number of different criteria including, but not limited to, adherence to license agreement terms, licensing cost efficiency, performance or the like. The execution engine 602 can receive the recommendation in some embodiments and can generate one or more signals to cause the recommended configuration to be executed, designed or the like. Although not shown, as with the governance engine 202, language engine 206 and recommendation engine 204, the execution engine can include memory, processor, data storage and other components that facilitate the functions of the execution engine 602.

Figure 7:
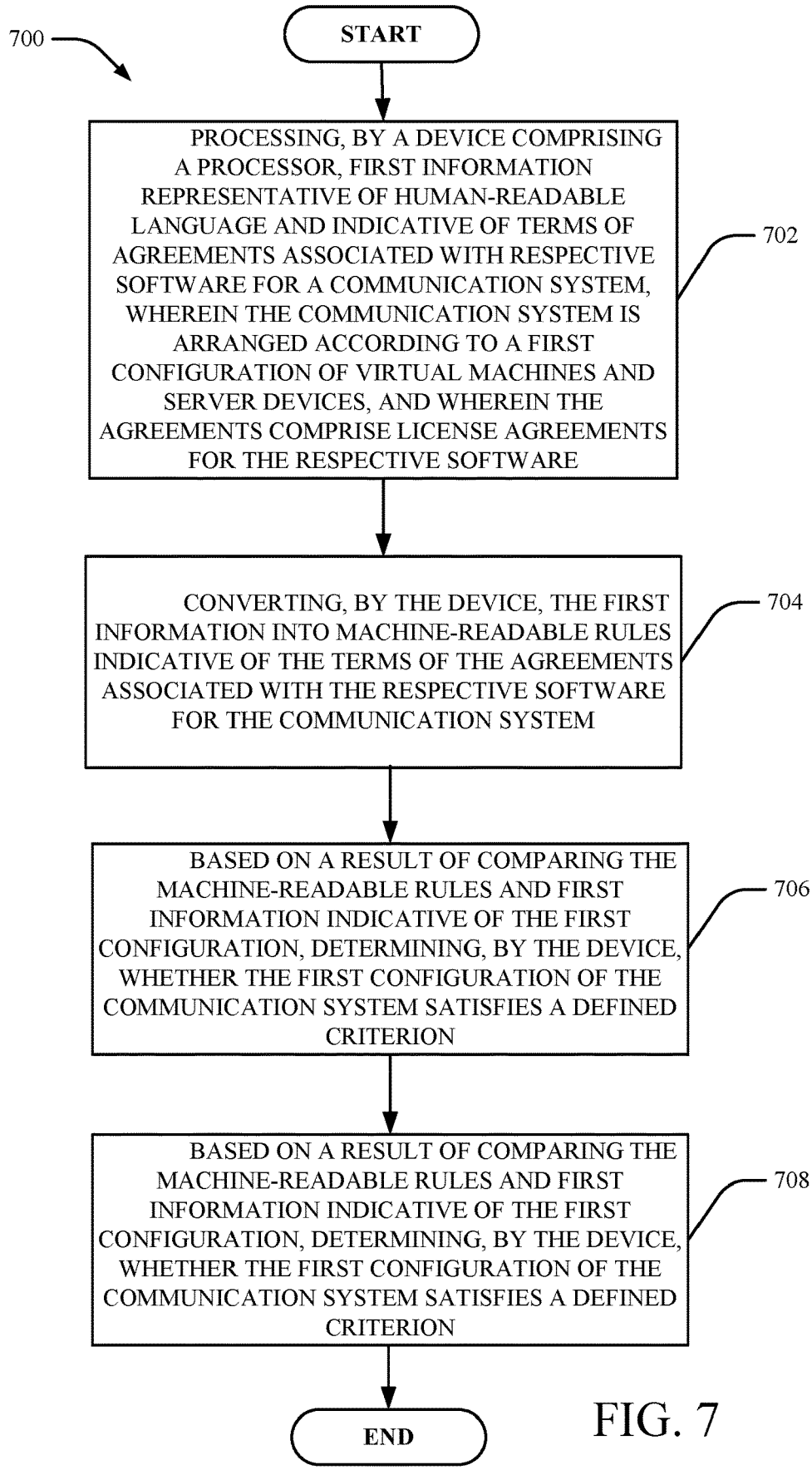
FIGS. 7, 8A, 8B, 9A, 9B, and 10 illustrate example flowcharts of methods that facilitate management of communication systems in accordance with one or more embodiments described herein.
Figure 8A:
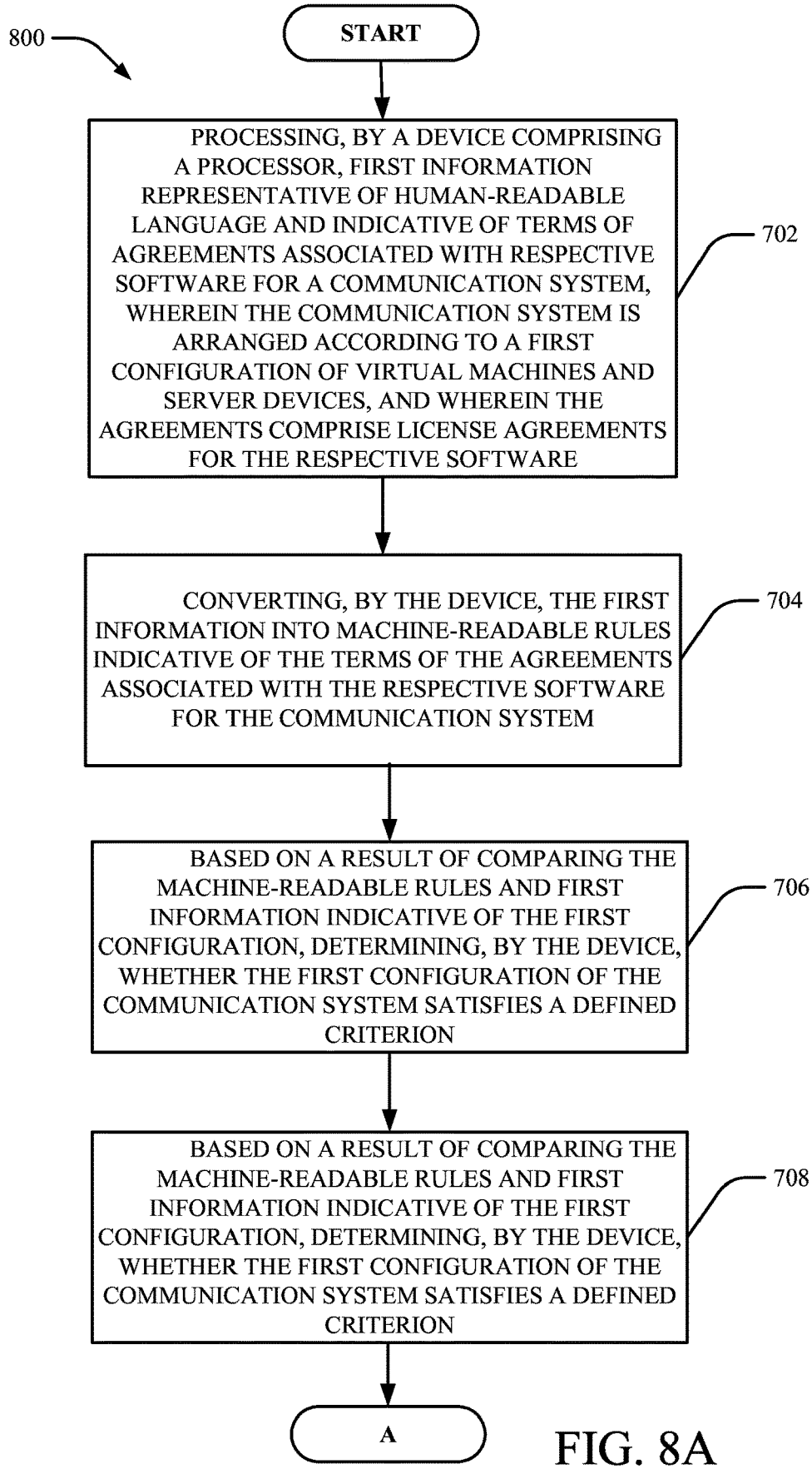
Figure 8B:
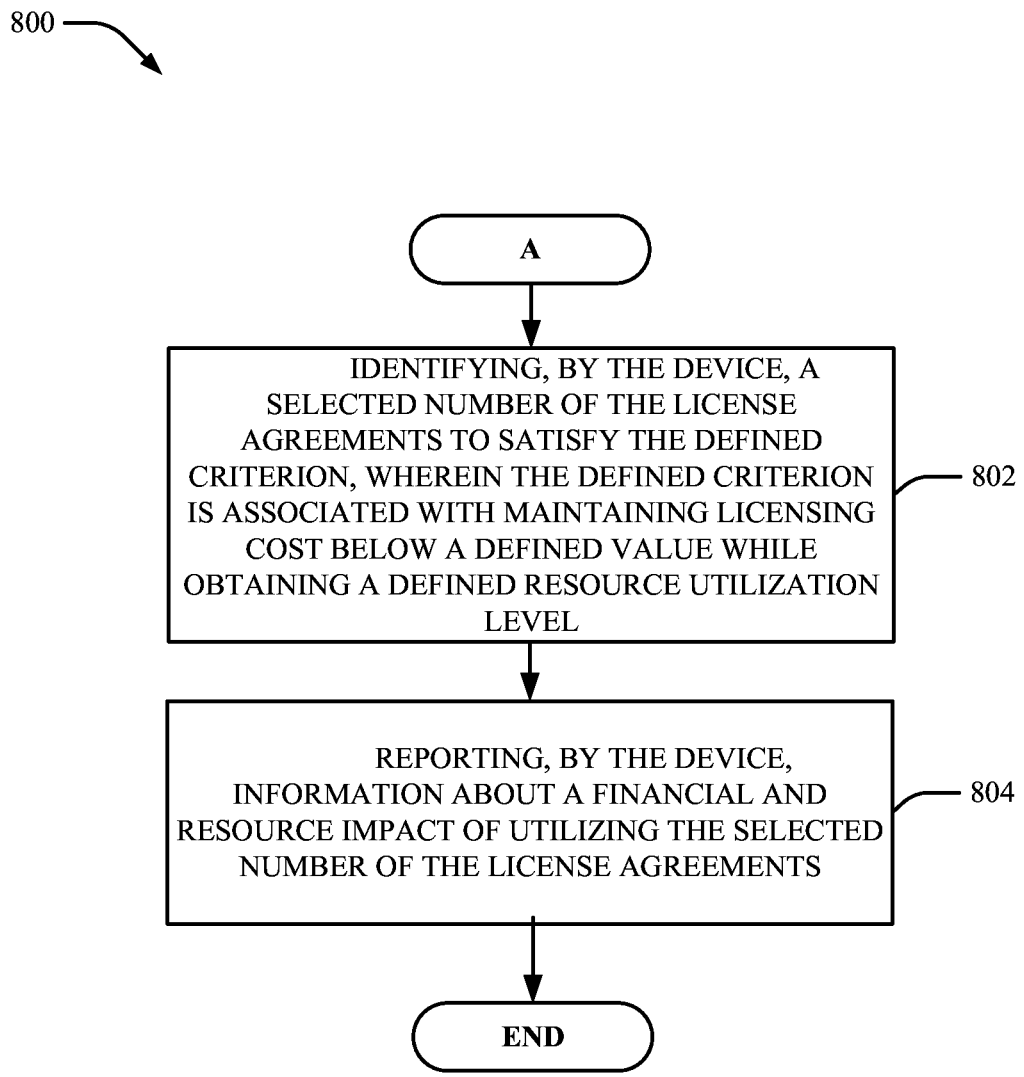
Figure 9A:
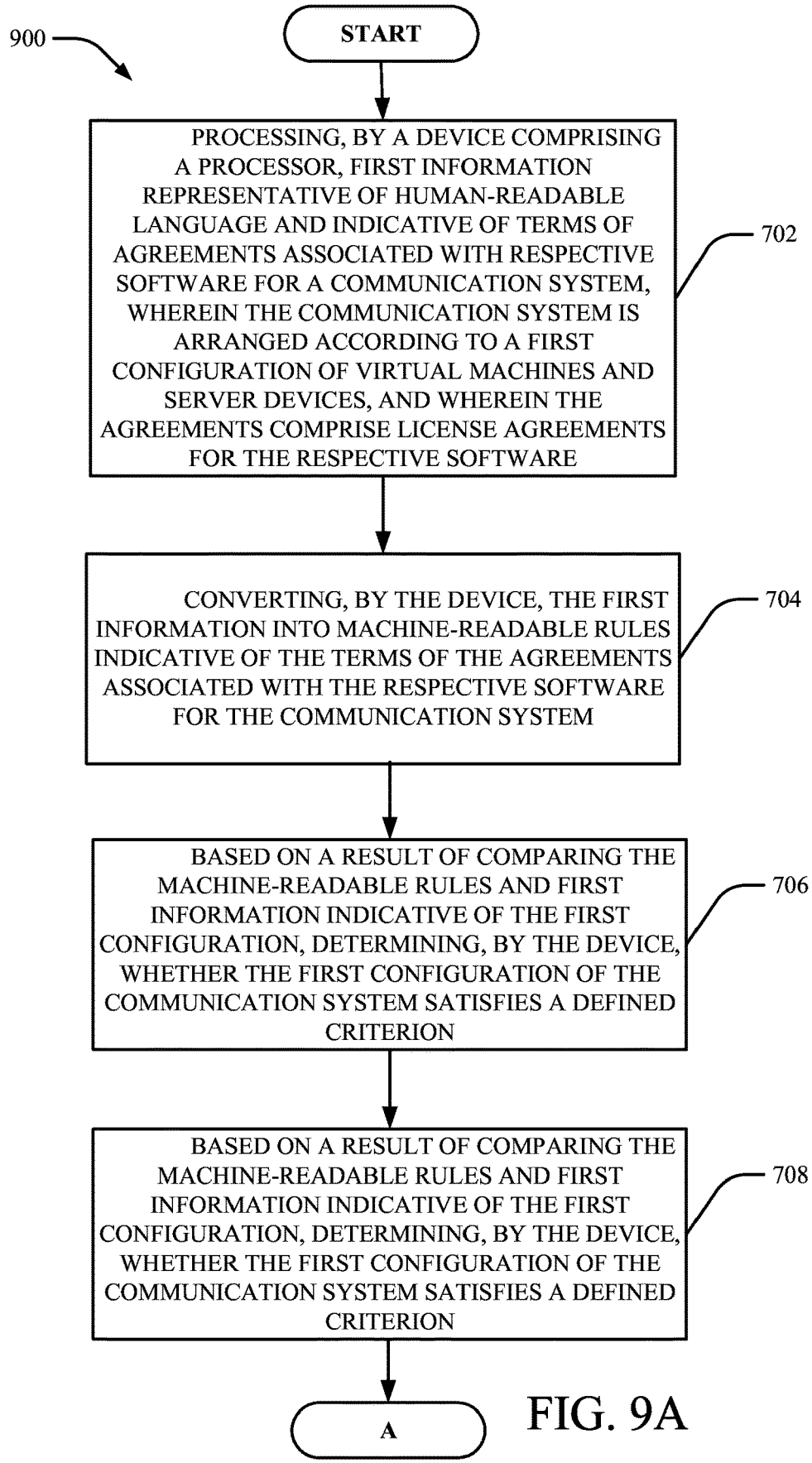
Figure 9B:
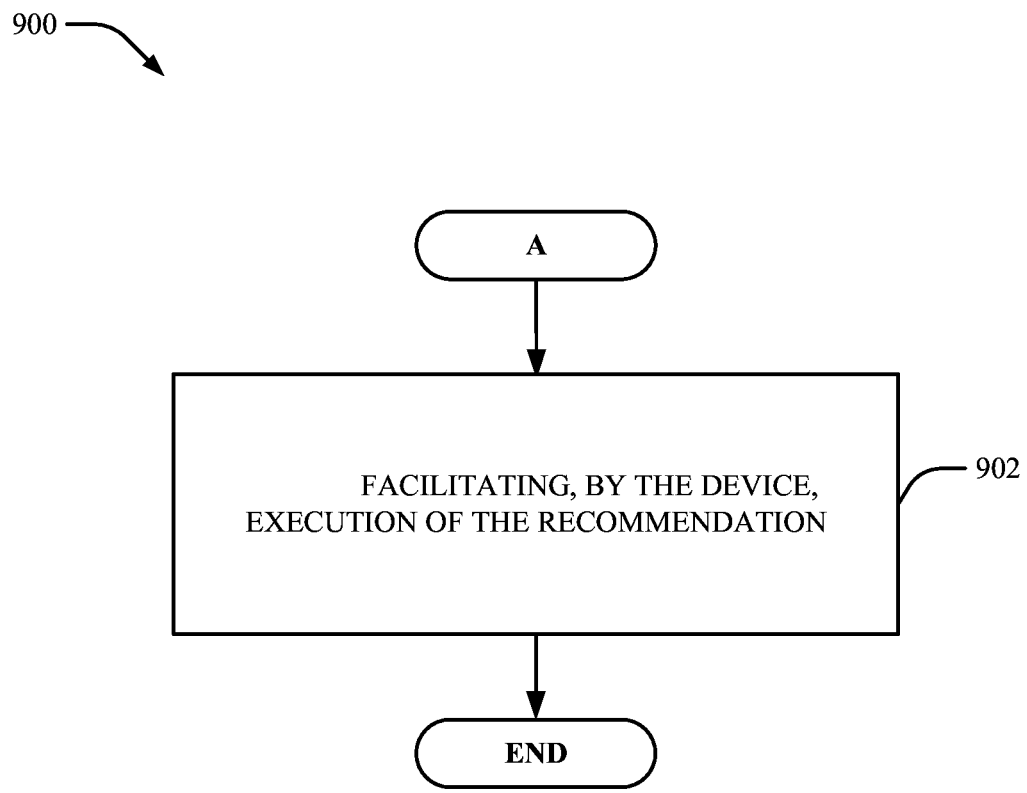

FIGS. 7, 8, 9 and 10 illustrate example flowcharts of methods that facilitate management of communication systems in accordance with one or more embodiments described herein. Turning first to FIG. 7, at 702, method 700 can include processing, by a device comprising a processor, first information representative of human-readable language and indicative of terms of agreements associated with respective software for a communication system, wherein the communication system is arranged according to a first configuration of virtual machines and server devices, and wherein the agreements comprise license agreements for the respective software. In some embodiments, a virtual image can also be included in the configuration.

At 704, method 700 can include converting, by the device, the first information into machine-readable rules indicative of the terms of the agreements associated with the respective software for the communication system. In some embodiments, the machine-readable rules are comprised in a set of machine-readable rules comprised in an industry standard that comprises a protocol identifying translation rules for converting agreement information to machine-readable rules, wherein different agreement information is associated with different machine-readable rules.

In some embodiments, the first information indicative of the first configuration further comprises resource information indicative of memory and processing associated with the virtual machines.

At 706, method 700 can include based on a result of comparing the machine-readable rules and first information indicative of the first configuration, determining, by the device, whether the first configuration of the communication system satisfies a defined criterion.

At 708, method 700 can also include based on an outcome of the determining whether the first configuration satisfies the defined criterion, generating a recommendation for a second configuration of the virtual machines, the server devices and the respective software in the communication system. In one embodiment, the defined criterion is associated with enhancing respective values of the software licenses. In one embodiment, the defined criterion is associated with reducing a likelihood of a legal penalty associated with a violations of the software licenses. In one embodiment, the defined criterion is associated with reducing a cost of the communication system.

In some embodiments, generating the recommendation for the second configuration of the virtual machines, the server devices and the respective software comprises generating a second configuration of the communication system comprising migration of at least one virtual machine from a first server device of the server devices to a second server device of the server devices based on a determination that the first configuration of the communication system fails to satisfies the defined criterion relative to the enhancing the values of the software licenses. In some embodiments, generating the recommendation for the second configuration of the virtual machines, the server devices and the respective software comprises generating a second configuration of the communication system, wherein the second configuration comprises additional license agreements for additional software added to a server device of the server devices and placement information regarding which of the virtual machines to migrate to the server device in association with the additional license agreements. In various embodiments, one or more virtual images can be migrated and/or re-allocated from one server device to another server device.

Now turning to FIGS. 8A and 8B, 702, 704, 706 and 708 of FIG. 7 can be performed as part of method 800. At 802, method 800 can include identifying, by the device, a selected number of the license agreements to satisfy the defined criterion, wherein the defined criterion is associated with maintaining licensing cost below a defined value while obtaining a defined resource utilization level. At 804, method 800 can include reporting, by the device, information about a financial and resource impact of utilizing the selected number of the license agreements. In some embodiments, although not shown, the reporting can also include reporting on the current or past state of the license use and/or value, as well as changes to the license over time.

Now turning to FIGS. 9A and 9B, 702, 704, 706 and 708 of FIG. 7 can be performed as part of method 900. At 902, method 900 can include facilitating, by the device, execution of the recommendation.

Figure 10:
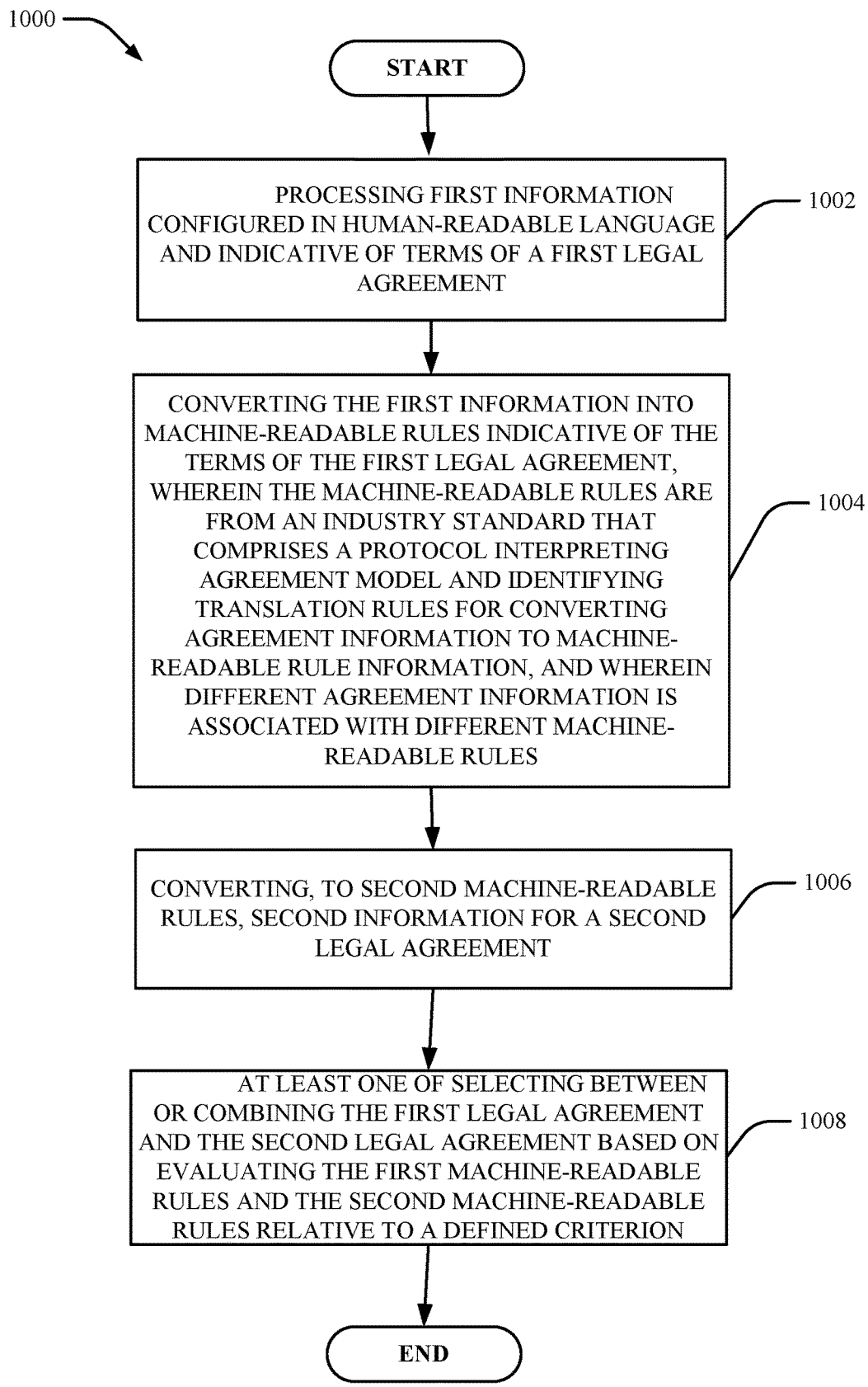

Turning now to FIG. 10, at 1002, method 1000 can include processing first information configured in human-readable language and indicative of terms of a first legal agreement. At 1004, method 1000 can include converting the first information into machine-readable rules indicative of the terms of the first legal agreement, wherein the machine-readable rules are from an industry standard that comprises a protocol interpreting agreement model and identifying translation rules for converting agreement information to machine-readable rule information, and wherein different agreement information is associated with different machine-readable rules. At 1006, method 1000 can include converting, to second machine-readable rules, second information for a second legal agreement. At 1008, method 1000 can include at least one of selecting between or combining the first legal agreement and the second legal agreement based on evaluating the first machine-readable rules and the second machine-readable rules relative to a defined criterion.

Based on the embodiments described herein, the management device 102 can also avoid or reduce the likelihood of a case of unnecessary licensing of an entire host (e.g., a single OS instance causing the entire host to be licensed, which is known as "licensing the cluster/cloud" and may result in too many licenses); avoid or reduce the likelihood of a need to manage/license the host independent of the virtual instances themselves; and/or avoid or reduce the likelihood of an inadvertent relocation of the virtual instances away from the licensed host.

Figure 11:
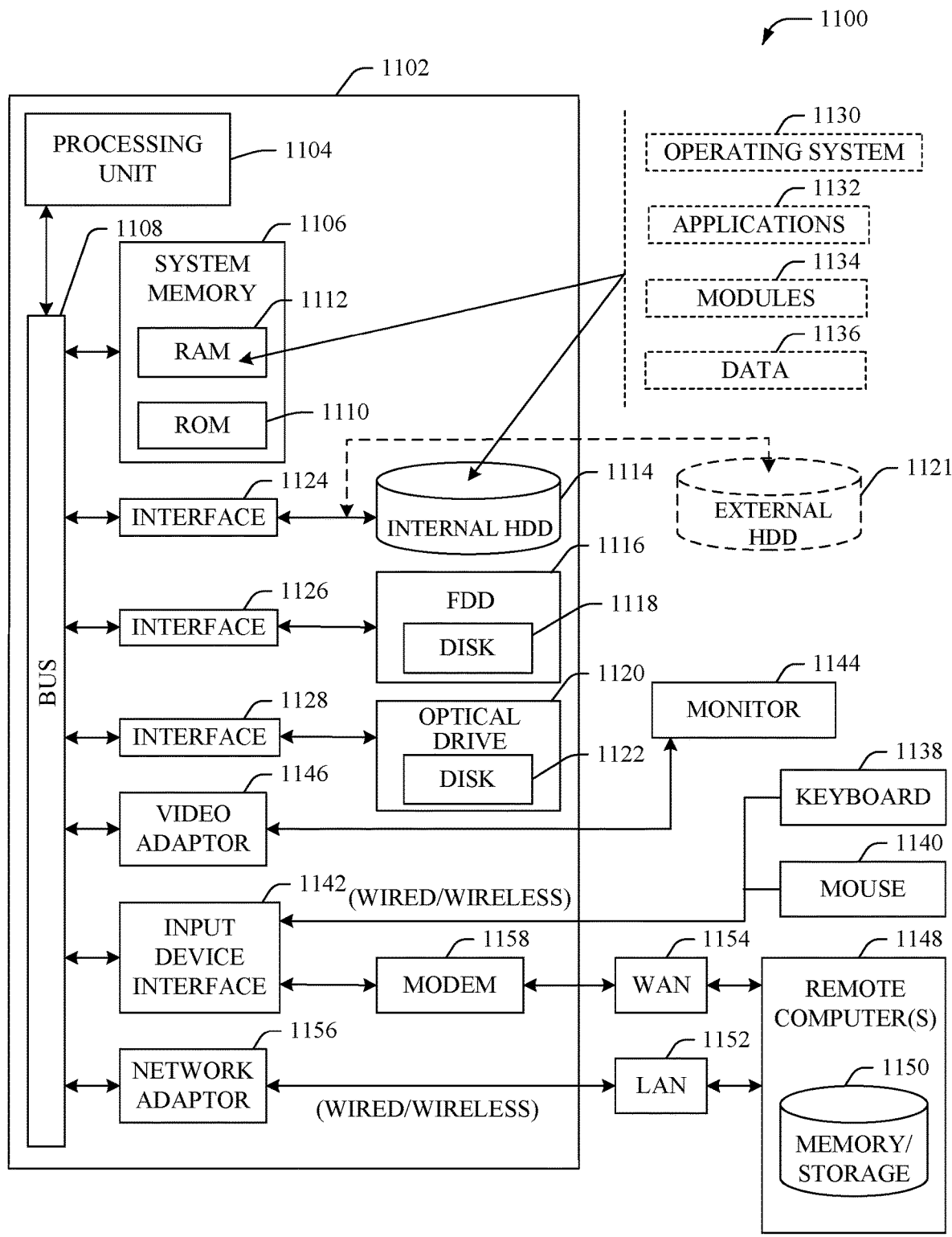
FIG. 11 illustrates a block diagram of a computer operable to facilitate management of communication systems in accordance with one or more embodiments described herein.

FIG. 11 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, management device 102, server devices 106, 108, 110, devices 122, 124 (or a component of management device 102, server devices 106, 108, 110, devices 122, 124).

In order to provide additional text for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment 1100 for implementing various embodiments of the embodiments described herein comprises a computer 1102, the computer 1102 comprising a processing unit 1104, a system memory 1106 and a system bus 1108. The system bus 1108 couples system components comprising, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1110 (e.g., EIDE, SATA), which internal hard disk drive 1114 can also be configured for external use in a suitable chassis (not shown), a magnetic floppy disk drive 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface, respectively. The interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1102, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A communication device can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also comprise a wireless AP disposed thereon for communicating with the wireless adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
processing, by a device comprising a processor, a document in a human-readable language format and indicative of terms of agreements associated with respective software for a communication system, wherein the communication system is arranged according to a current configuration of virtual machines and server devices, wherein an agreement of the agreements identifies a first configuration of virtual machines and server devices, and wherein the agreements comprise license agreements for the respective software;
converting, by the device, using an artificial intelligence model that performs language processing of the human-readable language format, the document into machine-executable rules that enforce the terms of the agreements associated with the respective software for the communication system;
determining, by the device, using the machine-executable-rules, whether the first configuration of the communication system satisfies a defined criterion; and
in response to determining that the first configuration satisfies the defined criterion outputting, by the device, a signal that causes the current configuration of the virtual machines and the server devices to change to the first configuration of the virtual machines and the server devices.

2. The method of claim 1, further comprising:
in response to determining that the first configuration does not satisfy the defined criterion, generating, by the device, a second configuration of the virtual machines and the server devices.

3. The method of claim 1, wherein the machine-executable rules are conformed to an industry standard that comprises a protocol identifying translation rules for converting agreement information to machine-executable rule information, and wherein different agreement information is associated with different machine-executable rules.

4. The method of claim 1, wherein the document further comprises resource information indicative of memory and processing associated with the virtual machines.

5. The method of claim 1, wherein the defined criterion is associated with enhancing respective values of the license agreements for the respective software.

6. The method of claim 2, wherein the second configuration comprises migration of a virtual machine from a first server device of the server devices to a second server device of the server devices.

7. The method of claim 1, wherein the defined criterion is associated with reducing a likelihood of a legal penalty associated with a violation of the license agreements for the respective software.

8. The method of claim 1, wherein the defined criterion is associated with reducing a cost of the communication system.

9. The method of claim 2, wherein the second configuration comprises additional license agreements for additional software added to a server device of the server devices and placement information regarding which of the virtual machines to migrate to the server device in association with the additional license agreements.

10. The method of claim 1, further comprising:
identifying, by the device, a selected number of the license agreements to satisfy the defined criterion, wherein the defined criterion is associated with maintaining licensing cost below a defined value while obtaining a defined resource utilization level; and
reporting, by the device, a financial and resource impact of utilizing the selected number of the license agreements.

11. The method of claim 1, further comprising:
identifying, by the device, a selected number of the license agreements to satisfy the defined criterion, wherein the defined criterion is associated with avoiding a legal penalty while obtaining a defined resource utilization level.

12. The method of claim 1, wherein the machine-executable rules are a function of resources used to qualify the license agreements and software of the respective software for the virtual machines, and wherein the resources comprise a number and speed of associated central processing units.

13. The method of claim 1, further comprising generating, by the device, a notification that the first configuration is not a recommended configuration.

14. The method of claim 2, wherein the signal is a first signal, and further comprising:
outputting, by the device, a second signal that causes the current configuration of communication system to change to the second configuration of the virtual machines and the server devices.

15. The method of claim 1, wherein the defined criterion is a function of locale-specific restrictions for the terms.

16. A device, comprising:
a processor; and
a memory that stores executable instructions that, when executed by the processor, facilitate performance of operations, comprising:
processing a document in a human-readable language format and indicative of terms of a legal agreement associated with a cloud system comprising a current configuration of virtual machines;
translating, using an artificial intelligence model that performs language processing of the human-readable language format, the document into machine-executable rules that apply the terms of the legal agreement;
determining a proposed configuration of the virtual machines based on the machine-executable rules; and
in response to determining that the proposed satisfies a defined criterion, transmitting a signal that causes the current configuration of the virtual machines to change to the proposed configuration of the virtual machines.

17. The device of claim 16, wherein the operations further comprise, in response to determining that the proposed configuration does not satisfy the defined criterion, generating an alternate configuration of the virtual machines based on the information.

18. A non-transitory machine-readable medium, comprising executable instructions that, when executed by a processor, facilitate performance of operations, comprising:
processing a document in a human-readable language format and indicative of terms of compliance agreements for a communication system, wherein the communication system is arranged according to a first configuration of virtual machines and server devices;
converting, using an artificial intelligence model that performs language processing of the human-readable language format, the document into machine-executable rules that implement the terms of the compliance agreements for the communication system;
determining, a second configuration of the virtual machines;
determining whether the second configuration satisfies a defined criterion based on the machine-executable rules; and
in response to determining that the first configuration satisfies the defined criterion, outputting a signal that causes the first configuration of the virtual machines to change to the second configuration.

19. The non-transitory machine-readable medium of claim 18, wherein the operations further comprise, in response to determining that the second configuration does not satisfy the defined criterion, generating a third configuration of the virtual machines based on the information.

20. The non-transitory machine-readable medium of claim 19, wherein the signal is a first signal, and the operations further comprise outputting a signal that causes the first configuration to change to the third configuration.

* * * * *